(12) United States Patent
Komazawa et al.

(10) Patent No.: US 11,845,266 B2
(45) Date of Patent: Dec. 19, 2023

(54) CONTROL DEVICE, NON-TRANSITORY COMPUTER READABLE MEDIUM, AND PRINTER

(71) Applicant: FUJIFILM Business Innovation Corp., Tokyo (JP)

(72) Inventors: Hisao Komazawa, Kanagawa (JP); Kentaro Ikeda, Kanagawa (JP); Kodai Suzuki, Kanagawa (JP); Takashi Betsuyaku, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 489 days.

(21) Appl. No.: 16/933,984

(22) Filed: Jul. 20, 2020

(65) Prior Publication Data
US 2021/0237483 A1 Aug. 5, 2021

(30) Foreign Application Priority Data
Jan. 31, 2020 (JP) ................. 2020-015621

(51) Int. Cl.
*B41J 11/00* (2006.01)
*B41J 11/48* (2006.01)
(Continued)

(52) U.S. Cl.
CPC ............ *B41J 11/0095* (2013.01); *B41J 3/46* (2013.01); *B41J 3/60* (2013.01); *B41J 11/485* (2013.01); *B41J 15/04* (2013.01); *B41J 15/044* (2013.01); *B41J 15/165* (2013.01); *B41J 29/393* (2013.01); *B65H 7/20* (2013.01); *B65H 29/125* (2013.01);
(Continued)

(58) Field of Classification Search
CPC ... B41J 11/0095; B41J 3/46; B41J 3/60; B41J 11/485; B41J 15/044; B41J 15/165; B41J 29/393; B41J 15/04; B41J 11/008; B65H 7/20; B65H 29/125; B65H 39/14; B65H 2301/412; B65H 2551/18; G06F 3/1222; B41F 17/00
See application file for complete search history.

(56) References Cited

U.S. PATENT DOCUMENTS 6,721,613 B1 4/2004 Yamamoto et al.
8,075,211 B2 12/2011 Yamamoto
(Continued)

FOREIGN PATENT DOCUMENTS

JP 2000048264 2/2000
JP 2004001930 A * 1/2004 .............. B65H 3/06
(Continued)

OTHER PUBLICATIONS

"Office Action of Japan Counterpart Application", dated Sep. 5, 2023, with English translation thereof, p. 1-p. 5.

*Primary Examiner* — Yaovi M Ameh
(74) *Attorney, Agent, or Firm* — JCIPRNET

(57) ABSTRACT

A control device includes a processor configured to: acquire information on a direction in which continuous paper is wound up, specify a viewable surface, which is a surface of the continuous paper viewable from a user in a state where the continuous paper has been wound up, on a basis of the direction in which the continuous paper is wound up, and control a printer to print print information, which is information on a job printed on the continuous paper, on the viewable surface.

15 Claims, 11 Drawing Sheets

(51) Int. Cl.
*B41J 29/393* (2006.01)
*B41J 3/60* (2006.01)
*B41J 15/04* (2006.01)
*B41J 15/16* (2006.01)
*B65H 7/20* (2006.01)
*B65H 29/12* (2006.01)
*G06F 3/12* (2006.01)
*B41J 3/46* (2006.01)
*B65H 39/14* (2006.01)
*B41F 17/00* (2006.01)

(52) U.S. Cl.
CPC ............ *B65H 39/14* (2013.01); *G06F 3/1222* (2013.01); *B41F 17/00* (2013.01); *B41J 11/008* (2013.01); *B65H 2301/412* (2013.01); *B65H 2551/18* (2013.01)

(56) References Cited

U.S. PATENT DOCUMENTS

| | | |
|---|---|---|
| 9,715,196 B2 | 7/2017 | Ishizuka et al. |
| 2004/0135836 A1* | 7/2004 | Nunokawa ............... B41J 29/38 347/16 |

FOREIGN PATENT DOCUMENTS

| | | | |
|---|---|---|---|
| JP | 2008191215 | 8/2008 | |
| JP | 2015007957 A * | 1/2015 | ............. G06F 3/048 |
| JP | 2015212759 | 11/2015 | |
| JP | 2019151028 | 9/2019 | |

* cited by examiner

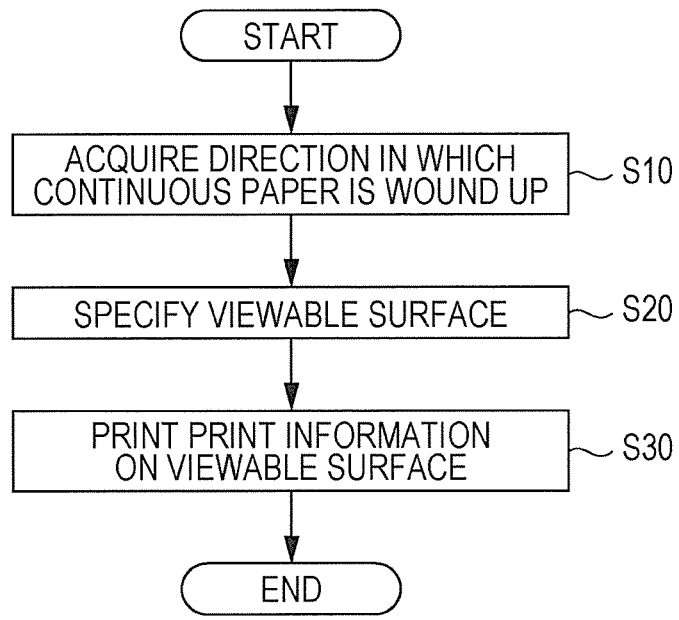
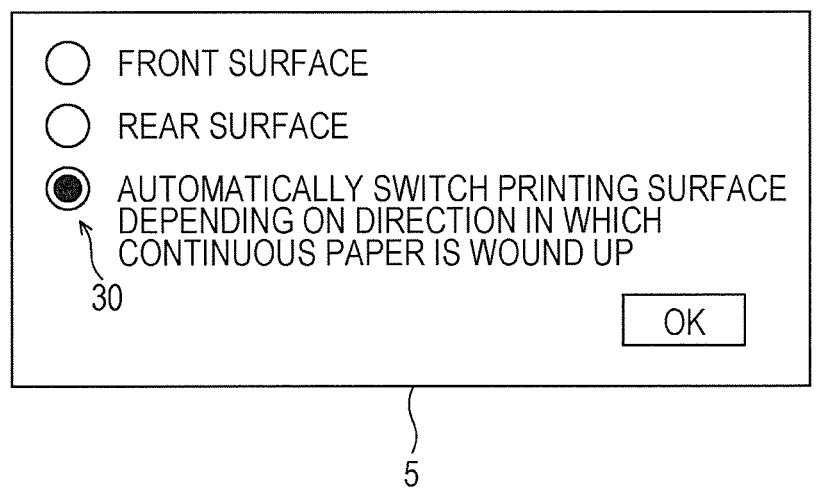

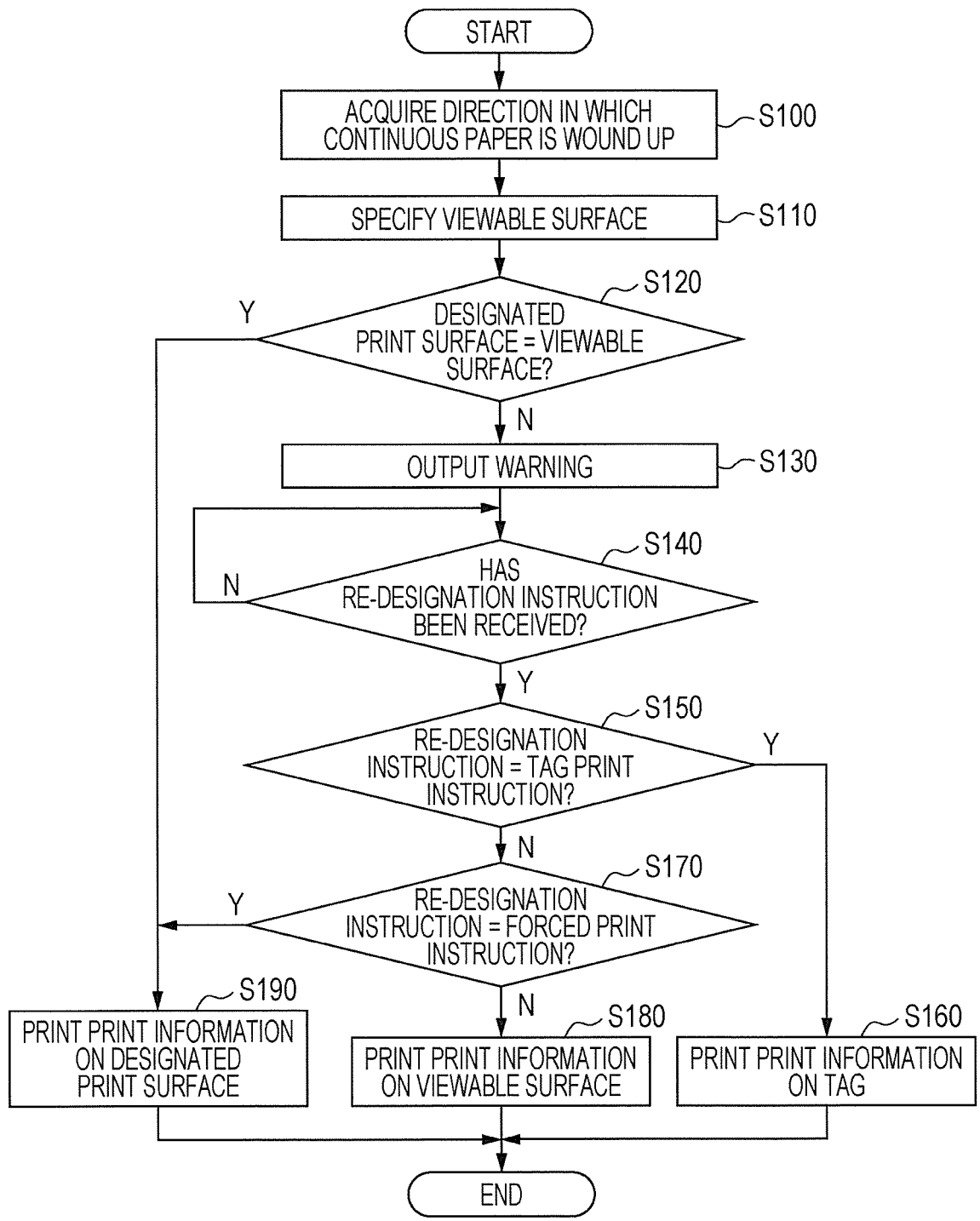

CONTROL DEVICE, NON-TRANSITORY COMPUTER READABLE MEDIUM, AND PRINTER

CROSS-REFERENCE TO RELATED APPLICATIONS

This application is based on and claims priority under 35 USC 119 from Japanese Patent Application No. 2020-015621 filed Jan. 31, 2020.

BACKGROUND

(i) Technical Field

The present disclosure relates to a control device, a non-transitory computer readable medium, and a printer.

(ii) Related Art

Japanese Unexamined Patent Application Publication No. 2008-191215 discloses a printing system including a printing unit that prints print information made up of plural pages on continuous paper and prints information on a print result of the plural pages on a part of the continuous paper that follows the plural pages, a containing unit in which sheets of continuous paper on which printing has been performed by the printing unit are stored in an order identical to an order of the printing, a paper feeding unit that feeds sheets of printed continuous paper contained in the containing unit in an order reverse to the order of the printing, a reading unit that reads the information on the print result printed on continuous paper fed by the paper feeding unit, and a post-processing unit that performs post-processing on the continuous paper fed by the paper feeding unit on the basis of the information on the print result read by the reading unit.

SUMMARY

For example, continuous paper is used for printing of printed materials such as magazines and newspapers. Such a printed material is printed on continuous paper based on designated imposition, and then post-processing such as cutting, folding, and binding is performed to complete the printed material.

In some cases, a printer that performs printing on continuous paper and a processing device that performs post-processing are independent devices that are located physically apart from each other, and therefore a user such as a worker carries printed continuous paper wound up in a concentric fashion by the printer to a storage place for continuous paper, for example, by using a wagon. Then, the user places designated printed continuous paper in the processing device and generates a printed material in accordance with a production plan of the printed material.

In view of this, the printed continuous paper wound up in a concentric fashion has thereon print information indicative of contents of the printed material printed on the continuous paper so that the user can easily check what is printed on the continuous paper.

However, the print information is printed on an inner surface of the continuous paper wound up in a concentric fashion depending on a direction in which the printed continuous paper is wound up in the printer. In this case, the user cannot check contents of the printed material printed on the continuous paper just by looking at outer appearance of the continuous paper.

Aspects of non-limiting embodiments of the present disclosure relate to a control device, a non-transitory computer readable medium, and a printer that can print print information, which is information on a job printed on continuous paper, on a printing surface viewable from a user in a state where the continuous paper has been wound up irrespective of a direction in which the continuous paper is wound up.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control device including a processor configured to: acquire information on a direction in which continuous paper is wound up, specify a viewable surface, which is a surface of the continuous paper viewable from a user in a state where the continuous paper has been wound up, on a basis of the direction in which the continuous paper is wound up, and control a printer to print print information, which is information on a job printed on the continuous paper, on the viewable surface.

BRIEF DESCRIPTION OF THE DRAWINGS

An exemplary embodiment of the present disclosure will be described in detail based on the following figures, wherein:

FIG. 7 is a flowchart illustrating an example of print processing for automatically switching a printing surface on which print information is to be printed;

FIG. 8 illustrates an example of a designation screen;

FIG. 9 is a flowchart illustrating an example of print processing performed in a case where one surface is designated as the printing surface on which print information is to be printed;

DETAILED DESCRIPTION

The present exemplary embodiment is described below with reference to the drawings. Note that identical constituent elements and identical processes are given identical reference signs throughout the drawings, and repeated description thereof is omitted.

Figure 1:
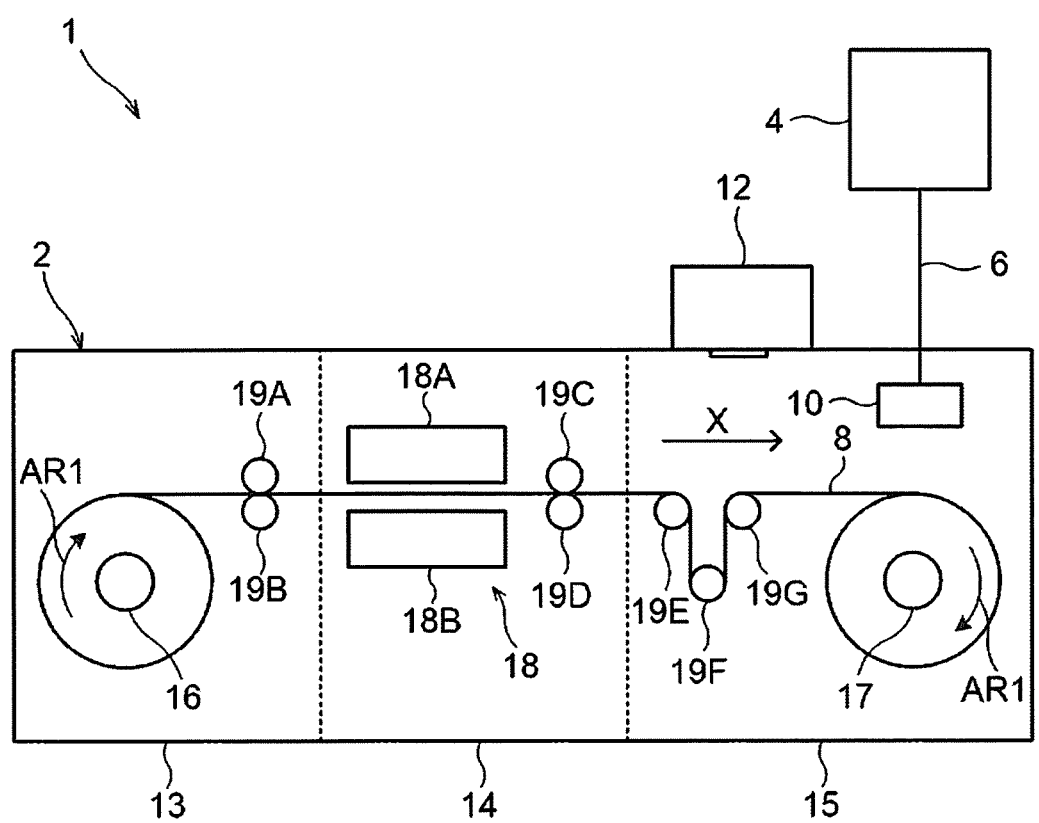
FIG. 1 illustrates an example of a configuration of a printing system.

FIG. 1 illustrates an example of a configuration of a printing system 1 according to the present exemplary embodiment. As illustrated in FIG. 1, the printing system 1 includes a printer 2 and a tag printer 4, which are connected over a communication line 6.

The printer 2 includes a paper feeding unit 13 that feeds a recording medium, a printing unit 14 that prints an image and characters on the recording medium fed from the paper feeding unit 13, and a containing unit 15 in which the recording medium on which the image and characters are printed by the printing unit 14.

The printer 2 uses continuous long paper (hereinafter referred to as "continuous paper 8") as the recording medium.

The paper feeding unit 13 is a unit that feeds the continuous paper 8 to the printing unit 14 and includes, for example, a paper feeding roller 16 and transport rollers 19A and 19B. The continuous paper 8 is attached to the paper feeding roller 16, for example, in a shape wound up in a concentric fashion along a lengthwise direction, that is, in a roll shape, and the continuous paper 8 is transported to the printing unit 14 while an end of the continuous paper 8 is held in a gap between the transport rollers 19A and 19B. The paper feeding roller 16 rotates in a direction indicated by arrow AR1 (clockwise direction) accordingly, and the continuous paper 8 attached to the paper feeding roller 16 is transported along a lengthwise direction (X direction in FIG. 1).

The printing unit 14 is a unit that prints an image and characters designated by a user on the continuous paper 8 transported from the paper feeding unit 13 in a designated color and includes, for example, a print engine 18 and transport rollers 19C and 19D.

The print engine 18 is constituted by a front surface print engine 18A and a rear surface print engine 18B, and the front surface print engine 18A prints an image and characters designated by a user on one surface of the continuous paper 8 in a designated color. The rear surface print engine 18B prints an image and characters designated by a user on the other surface of the continuous paper 8 in a designated color.

Note that the front surface and the rear surface of the continuous paper 8 are definitions for descriptive purposes, and any of print surfaces of the continuous paper 8 may be regarded as the front surface. For example, in the present exemplary embodiment, a printing surface on which an image and characters are printed by the front surface print engine 18A is referred to as a "front surface of the continuous paper 8", and a printing surface on which an image and characters are printed by the rear surface print engine 18B is referred to as a "rear surface of the continuous paper 8".

A printing system employed in the front surface print engine 18A and the rear surface print engine 18B is not limited to a specific system and can be, for example, an electrophotographic system or an inkjet system.

The transport rollers 19C and 19D transport the continuous paper 8 to the containing unit 15 while holding the continuous paper 8 in the gap therebetween so that the continuous paper 8 does not sag.

The containing unit 15 is a unit that winds up the continuous paper 8 on which an image and characters are printed by the printing unit 14 and includes, for example, a containing roller 17 and transport rollers 19E, 19F, and 19G.

An end of the transported continuous paper 8 is attached to the containing roller 17. For example, by driving the containing roller 17 to rotate in a direction indicated by arrow AR1 by a driving unit (not illustrated), the printed continuous paper 8 is wound up by the containing roller 17 in a concentric fashion and is contained in the containing unit 15. The containing roller 17 is also rotatable in a direction opposite to the direction indicated by arrow AR1, and a direction in which the containing roller 17 rotates, that is, a direction in which the continuous paper 8 is wound up is selected based on setting of the printer 2.

Note that arrow AR1 indicates a rotation direction obtained when a side surface (reference side surface) of the printer 2 located on the right side of the continuous paper 8 in a case where a downstream side of a transport direction of the continuous paper 8 is viewed from an upstream side along the X direction is viewed from a reference side surface side along a direction in which a rotary shaft of the containing roller 17 extends. Although the containing roller 17 rotates in a direction (counterclockwise direction) opposite to the direction indicated by arrow AR1 when the containing roller 17 is viewed from a side surface opposite to the reference side surface, it is assumed in the present exemplary embodiment that the direction in which the containing roller 17 rotates is a direction obtained when the containing roller 17 is viewed from the reference side surface.

The transport rollers 19E, 19F, and 19G give tension to the continuous paper 8 so that the transported continuous paper 8 is not loosely wound up by the containing roller 17 and adjusts a transport position of the continuous paper 8 so that an end along a lengthwise direction of the continuous paper 8 wound up by the containing roller 17 is located evenly.

Processing of the printer 2 that operates as above is controlled by a control device 10. Although the control device 10 is included in the containing unit 15 in the example of the configuration of the printer 2 illustrated in FIG. 1, there is no restriction on a position where the control device 10 is provided, and the control device 10 may be provided in the paper feeding unit 13 or may be provided in the printing unit 14. Furthermore, the control device 10 need not necessarily be provided in the printer 2 and may be an independent device different from the printer 2.

The control device 10 and the tag printer 4 are connected over the communication line 6. Depending on settings in the printer 2, the control device 10 requests the tag printer 4 to perform printing on a tag.

The "tag" refers to a recording medium attached to the continuous paper 8, and print information 3 indicative of contents of a printed material printed on the continuous paper 8 by the printer 2 is printed on the tag, as described later.

The tag printer 4 generates a tag by printing the print information 3 designated by the control device 10 onto a recording medium.

Unlike the printer 2, the tag printer 4 uses, as a recording medium, cut paper that has been cut in a predetermined size such as A4 or A3 so that a tag having a size that is easy to be attached to the continuous paper 8 is generated.

The communication line 6 that connects the control device 10 and the tag printer 4 may be a wired line or may be a wireless line or may be a line combining a wired line and a wireless line. Furthermore, the communication line 6 may be a dedicated line such as an in-company local area network (LAN) or may be a public line (e.g., the Internet) shared by a large indefinite number of users.

Although a state where the printer 2 and the tag printer 4 are connected to the communication line 6 is illustrated as an example in FIG. 1, a device (hereinafter referred to as an "external device") other than the printer 2 and the tag printer 4 may be connected to the communication line 6.

Furthermore, a UI unit 12 is connected to the control device 10. The UI unit 12 is a unit that offers an interface between the printer 2 and a user. The UI unit 12 receives an instruction from a user and notifies the user about a processing status in the printer 2.

Figure 2:
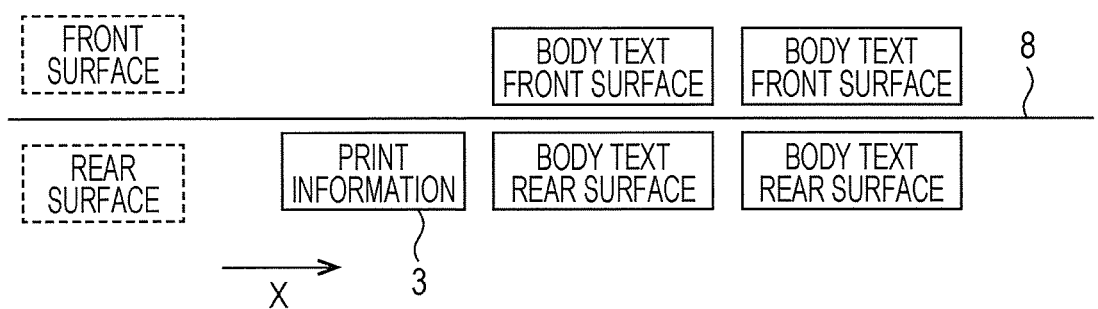
FIG. 2 illustrates an example of printing on continuous paper.

FIG. 2 illustrates an example of printing on the continuous paper 8 by the printer 2. The control device 10 of the printer 2 controls the printer 2 to print contents on the continuous paper 8 in accordance with preset imposition information. The printed contents and imposition information are managed as a job in the printer 2. That is, the job is a print management entity that manages information on printing such as a file name of print data, printed contents, and imposition information and is prepared for each printed material to be printed by the printer 2.

In the example illustrated in FIG. 2, a body text (hereinafter referred to as a "body text front surface") imposed on a front surface is printed on the front surface of the continuous paper 8, and a body text (hereinafter referred to as a "body text rear surface") imposed on a rear surface opposite to the body text front surface is printed on the rear surface of the continuous paper 8.

Meanwhile, the control device 10 prints, on a final region of the continuous paper 8, print information 3, which is information on a job of a printed material printed on the continuous paper 8, so that a user can easily check what is printed on the continuous paper 8.

Figure 3:
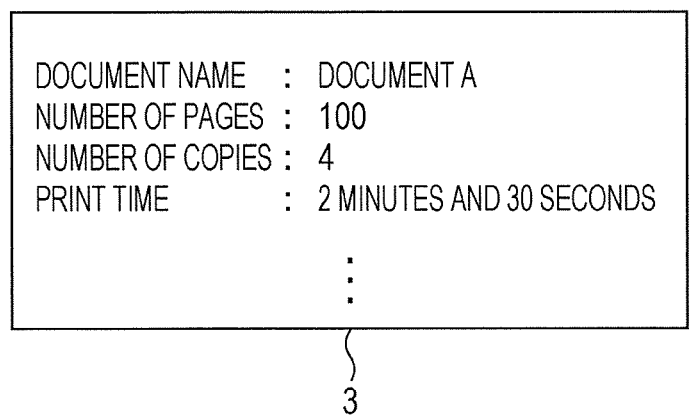
FIG. 3 illustrates an example of print information.

FIG. 3 illustrates an example of the print information 3. The print information 3 includes, for example, information such as a document name of a printed material printed on the continuous paper 8, the number of pages of the printed material, the number of copies of the printed material, and a printing period required for printing of the printed material. Information printed as the print information 3 may be any information on a job of a printed material printed on the continuous paper 8 and may include information such as information necessary for management of the continuous paper 8 such as an identification number for identifying the continuous paper 8 or information on a user who is in charge of printing on the continuous paper 8.

The final region of the continuous paper 8 is a region corresponding to a final one round, in the lengthwise direction, of the continuous paper 8 wound up by the containing roller 17. The control device 10 controls the printer 2 to print the print information 3 on the final region of the printing surface of the continuous paper 8 designated by the user. As a result, the print information 3 is displayed on a side surface of the continuous paper 8 wound up in a concentric fashion. This allows the user to check the print information 3.

However, in a case where the print information 3 is printed on a printing surface of the continuous paper 8 designated by a user, a situation in which the user cannot check the print information 3 can occur.

Figure 4:
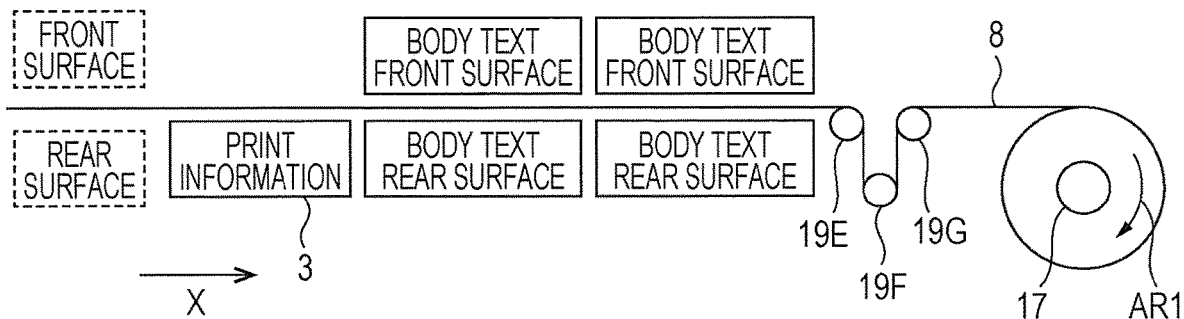
FIG. 4 illustrates an example of printing in which print information is hidden on a side opposite to a viewable surface of continuous paper.

For example, as illustrated in FIG. 4, in a case where the print information 3 is printed on a rear surface of the continuous paper 8 in accordance with an instruction from a user and the continuous paper 8 is wound up by rotating the containing roller 17 in the direction indicated by arrow AR1 while an end of the continuous paper 8 is wound around the containing roller 17 from an upper side of the containing roller 17, the print information 3 is hidden on a side opposite to a printing surface (hereinafter referred to as a "viewable surface") of the continuous paper 8 viewable from the user even in a state where the continuous paper 8 has been wound up by the containing roller 17.

Figure 5:
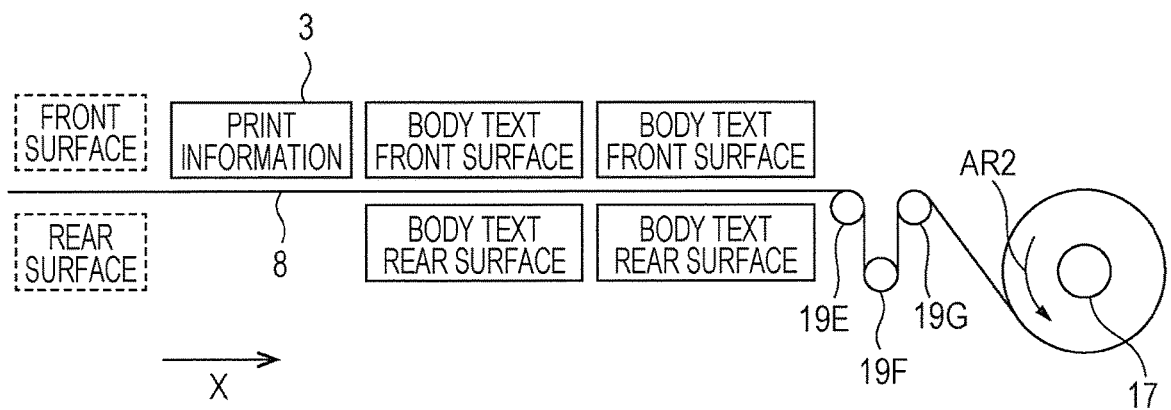
FIG. 5 illustrates another example of printing in which print information is hidden on a side opposite to a viewable surface of continuous paper.

Furthermore, the print information 3 is hidden on a side opposite to a viewable surface of the continuous paper 8 also in a case where the print information 3 is printed on the front surface of the continuous paper 8 in accordance with an instruction from a user and the continuous paper 8 is wound up by rotating the containing roller 17 in a direction indicated by arrow AR2 while an end of the continuous paper 8 is wound around the containing roller 17 from a lower side of the containing roller 17, as illustrated in FIG. 5.

The print information 3 is printed on the viewable surface of the continuous paper 8 if the print information 3 is printed on the front surface of the continuous paper 8 in the case of FIG. 4 and if the print information 3 is printed on the rear surface of the continuous paper 8 in the case of FIG. 5. In view of this, the control device 10 acquires information on a direction in which the continuous paper 8 is wound up and controls the printer 2 to print the print information 3 on the viewable surface of the continuous paper 8 wound up in a concentric fashion.

Winding up the continuous paper 8 by rotating the containing roller 17 in clockwise direction after winding an end of the continuous paper 8 around the containing roller 17 from an upper side of the containing roller 17 as illustrated in FIG. 4 is referred to as "winding up the continuous paper 8 from an upper side", and winding up the continuous paper 8 by rotating the containing roller 17 in counter clockwise direction after winding an end of the continuous paper 8 around the containing roller 17 from a lower side of the containing roller 17 as illustrated in FIG. 5 is referred to as "winding up the continuous paper 8 from a lower side".

Details of processing for printing the print information 3 executed by the control device 10 will be described later.

Next, an example of a configuration of a substantial part of an electric system in the printer 2 is described.

Figure 6:
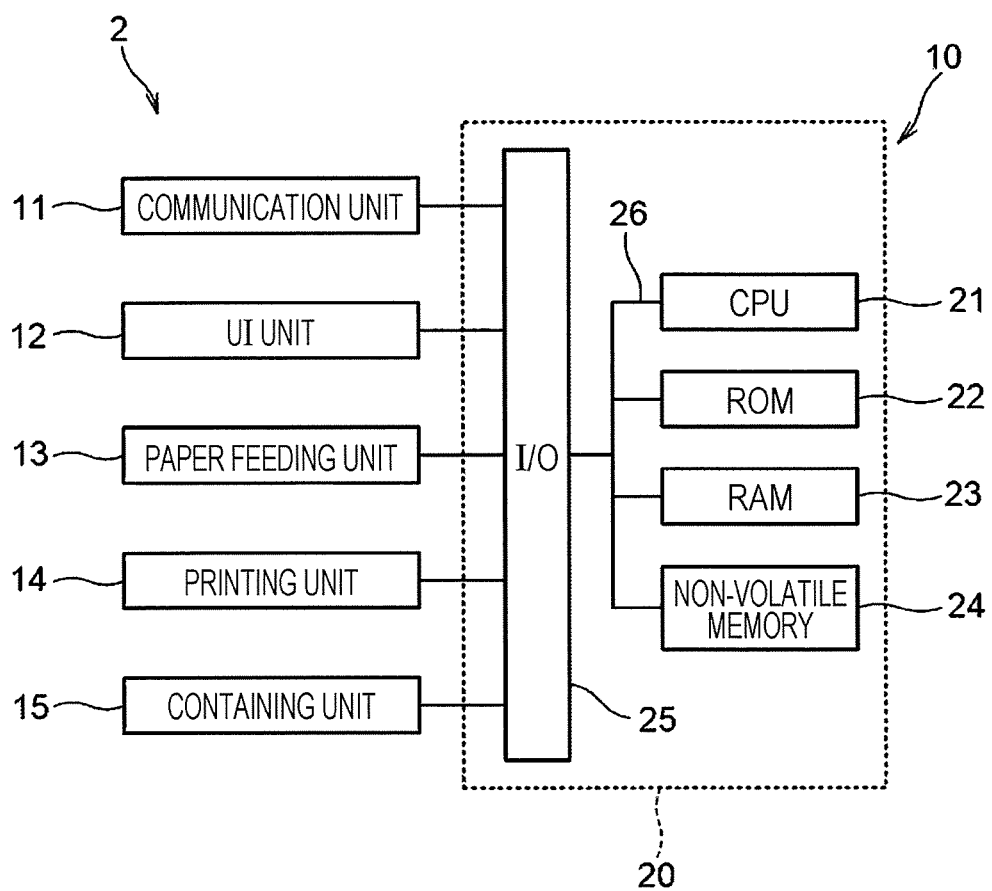
FIG. 6 illustrates an example of a configuration of a substantial part of an electric system in a printer.

FIG. 6 illustrates an example of a configuration of a substantial part of an electric system in the printer 2. The control device 10 in the printer 2 is, for example, a computer 20.

The computer 20 includes a central processing unit (CPU) 21 that reads a control program and executes processing related to the control device 10, a read only memory (ROM) 22 in which a control program for causing the computer 20 to function as the control device 10 is stored, a random access memory (RAM) 23 used as a temporary working area of the CPU 21, a non-volatile memory 24, and an input output interface (I/O) 25. The CPU 21, the ROM 22, the RAM 23, the non-volatile memory 24, and the I/O 25 are connected to one another through a bus 26.

The non-volatile memory 24 is an example of a storage device that keeps stored information even if power supplied to the non-volatile memory 24 is cut off. The non-volatile memory 24 is, for example, a semiconductor memory but may be a hard disk. The non-volatile memory 24 need not necessarily be provided in the computer 20 and may be, for example, a portable storage device that is attachable to and detachable from the computer 20.

To the I/O 25, members such as a communication unit 11, the UI unit 12, the paper feeding unit 13, the printing unit 14, and the containing unit 15 are connected.

The communication unit 11 is connected to the communication line 6 and includes a communication protocol for data communication with the tag printer 4 and the external device connected to the communication line 6.

The UI unit 12 has an input device such as buttons, a keyboard, a mouse, or a touch panel for receiving an instruction from a user and has an output device such as a light emitting diode (LED) or a liquid crystal display to notify a user about information processed by the control device 10.

Functions of the paper feeding unit 13, the printing unit 14, and the containing unit 15 have been described above, and description thereof is omitted.

Next, processing for printing the print information 3 executed by the control device 10 is described.

FIG. 7 is a flowchart illustrating an example of processing for printing the print information 3 executed by the CPU 21 of the control device 10.

The CPU 21 causes a designation screen 5 (see FIG. 8), which is for designating a printing surface on which the print information 3 is to be printed, to be displayed on the UI unit 12, for example, before start of printing control based on a print instruction.

On the designation screen 5, "FRONT SURFACE" for setting a front surface as a printing surface on which the print information 3 is to be printed, "REAR SURFACE" for setting a rear surface as a printing surface on which the print information 3 is to be printed, and "AUTOMATICALLY SWITCH PRINTING SURFACE DEPENDING ON DIRECTION IN WHICH CONTINUOUS PAPER IS WOUND UP" for causing the CPU 21 to automatically decide a printing surface on which the print information 3 is to be printed depending on a direction in which the continuous paper 8 is wound up are displayed, and a radio button 30 is associated with each of these options. A user selects a radio button 30 corresponding to a desired option and designates a printing surface on which the print information 3 is to be printed by pressing an "OK" button. Although only options for printing the print information 3 on the continuous paper 8 are selectable on the designation screen 5 of FIG. 8, an option "PRINT PRINT INFORMATION ON TAG PRINTER" may be, for example, added. In a case where this option is selected, the CPU 21 may print the print information 3 on a tag by using the tag printer 4.

Processing for printing the print information 3 illustrated in FIG. 7 is processing executed by the CPU 21 in a case where a user designates "AUTOMATICALLY SWITCH PRINTING SURFACE DEPENDING ON DIRECTION IN WHICH CONTINUOUS PAPER IS WOUND UP" on the designation screen 5.

A control program that defines the processing for printing the print information 3 is stored in advance, for example, in the ROM 22 of the control device 10. The CPU 21 of the control device 10 executes the processing for printing the print information 3 by reading the control program stored in the ROM 22.

In step S10, the CPU 21 acquires information on a direction in which the continuous paper 8 is wound up such as whether the continuous paper 8 is wound up from an upper side or a lower side in the containing unit 15. The control device 10 may acquire the information on a direction in which the continuous paper 8 is wound up, for example, by detecting a rotation direction of the containing roller 17. Alternatively, the printer 2 may detect a rotation direction of the containing roller 17, and the CPU 21 may acquire information on a direction in which the continuous paper 8 is wound up obtained from the detected rotation direction of the containing roller 17 from the printer 2 through the communication unit 11. Alternatively, the CPU 21 may acquire, from the non-volatile memory 24, information on a direction in which the continuous paper 8 is wound up that is set in advance by a user.

Note that the process in step S10 is executed after an instruction to print a job is received from the user and before print control based on a print instruction is performed in the printer 2.

In step S20, the CPU 21 specifies a viewable surface of the continuous paper 8 on the basis of the information on the direction in which the continuous paper 8 is wound up acquired in step S10. Specifically, in a case where the direction in which the continuous paper 8 is wound up is clockwise direction, the continuous paper 8 is wound up from an upper side. Accordingly, the viewable surface of the continuous paper 8 is the front surface of the continuous paper 8, as described with reference to FIG. 4.

Meanwhile, in a case where the direction in which the continuous paper 8 is wound up is counterclockwise direction, the continuous paper 8 is wound up from a lower side. Accordingly, the viewable surface of the continuous paper 8 is the rear surface of the continuous paper 8, as described with reference to FIG. 5.

In step S30, the CPU 21 controls the printer 2 to print a body text of a printed material corresponding to the job to be printed and then print the print information 3 on a final region of the viewable surface of the continuous paper 8 specified in step S20. This ends the processing for printing the print information 3 illustrated in FIG. 7.

Therefore, in a case where the user designates "AUTOMATICALLY SWITCH PRINTING SURFACE DEPENDING ON DIRECTION IN WHICH CONTINUOUS PAPER IS WOUND UP" on the designation screen 5 illustrated in FIG. 8, the printer 2 prints the print information 3 on the viewable surface of the continuous paper 8 irrespective of a direction in which the continuous paper 8 is wound up.

In a case where information on a direction in which the continuous paper 8 is wound up is not acquired for some reason in step S10, the CPU 21 cannot specify a viewable surface of the continuous paper 8. In such a case, the CPU 21 prints the print information 3 on final regions of both surfaces of the continuous paper 8. As a result, the print information 3 is printed on the viewable surface of the continuous paper 8.

As described above, in a case where the user designates "AUTOMATICALLY SWITCH PRINTING SURFACE DEPENDING ON DIRECTION IN WHICH CONTINUOUS PAPER IS WOUND UP" on the designation screen 5 illustrated in FIG. 8, the printer 2 prints the print information 3 on the viewable surface of the continuous paper 8.

However, in a case where the user designates, as a printing surface on which the print information 3 is to be printed, "FRONT SURFACE" or "REAR SURFACE" on the designation screen 5, the print information 3 is printed on a side opposite to the viewable surface depending on a direction in which the continuous paper 8 is wound up. In this case, the user cannot see the print information 3.

In view of this, the control device 10 controls the printer 2 to print the print information 3 on a viewable surface of the continuous paper 8 even in a case where the user designates "FRONT SURFACE" or "REAR SURFACE" as a printing surface on which the print information 3 is to be printed on the designation screen 5.

FIG. 9 is a flowchart illustrating an example of processing for printing the print information 3 executed by the CPU 21 of the control device 10 in a case where a designation instruction to designate "FRONT SURFACE" or "REAR SURFACE" as a printing surface on which the print information 3 is to be printed is received on the designation screen 5.

In step S100, the CPU 21 performs a process similar to the process in step S10 of FIG. 7. Specifically, the CPU 21 acquires information on a direction in which the continuous paper 8 is wound up in the containing unit 15.

In step S110, the CPU 21 performs a process similar to the process in step S20 of FIG. 7. Specifically, the CPU 21 specifies a viewable surface of the continuous paper 8 on the basis of the information on the direction in which the continuous paper 8 is wound up acquired in step S100.

In step S120, the CPU 21 determines whether or not a designated printing surface designated by the designation instruction is the viewable surface of the continuous paper 8. In a case where the designated printing surface is the viewable surface of the continuous paper 8, step S190 is performed.

In this case, when the print information 3 is printed on the designated printing surface, the user can see the print information 3 even in a state where the continuous paper 8 has been wound up. Therefore, in step S190, the CPU 21 controls the printer 2 to print the print information 3 on a final region of the designated printing surface of the continuous paper 8. This ends the processing for printing the print information 3 illustrated in FIG. 9.

Meanwhile, in a case where the designated printing surface is different from the viewable surface of the continuous paper 8, step S130 is performed.

In this case, if the print information 3 is printed on the designated printing surface, the user cannot see the print information 3 in a state where the continuous paper 8 has been wound up. Therefore, in step S130, the CPU 21 outputs a warning.

Specifically, the CPU 21 causes a confirmation screen 7 notifying the user that the printing surface on which the print information 3 is to be printed is inconsistent with the direction in which the continuous paper 8 is wound up to be displayed on the UI unit 12. Note that the CPU 21 may not only display the confirmation screen 7 but also give an audio notification indicating that the printing surface on which the print information 3 is to be printed is inconsistent with the direction in which the continuous paper 8 is wound up.

Figure 10:
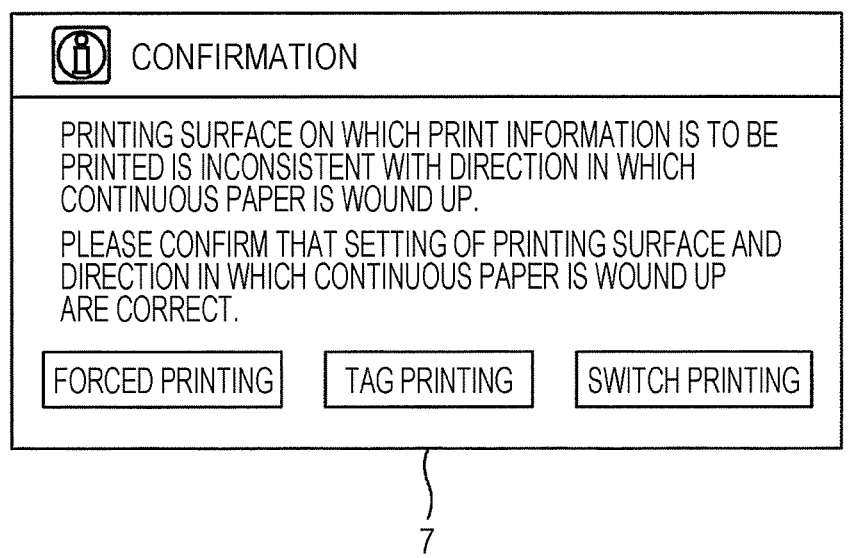
FIG. 10 illustrates an example of a confirmation screen.

FIG. 10 illustrates an example of the confirmation screen 7. The confirmation screen 7 includes a forced printing button for forcibly printing the print information 3 on the printing surface designated by the user on the designation screen 5 even if the print information 3 is printed on a side opposite to the viewable surface of the continuous paper 8, a tag printing button for printing the print information 3 on a tag by using the tag printer 4, and a switching printing button for switching the printing surface on which the print information 3 is to be printed from the printing surface designated by the user on the designation screen 5 to the viewable surface of the continuous paper 8.

The user gives the CPU 21 a re-designation instruction to designate again the printing surface on which the print information 3 is to be printed by pressing any of the buttons displayed on the confirmation screen 7.

Meanwhile, in step S140, the CPU 21 determines whether or not the re-designation instruction has been received. In a case where the re-designation instruction has not been received, the CPU 21 waits for a re-designation instruction while repeatedly executing the determining process in step S140.

Meanwhile, in a case where the re-designation instruction has been received, step S150 is performed. Upon receipt of the re-designation instruction, the CPU 21 prints the print information 3 in accordance with the re-designation instruction.

In step S150, the CPU 21 determines whether or not a tag print instruction to print the print information 3 on a tag has been received as the re-designation instruction. In a case where the tag print instruction has been received, step S160 is performed.

In step S160, the CPU 21 controls the tag printer 4 to print the print information 3 not on the continuous paper 8 but on a tag in accordance with the contents of the re-designation instruction. This ends the processing for printing the print information 3 illustrated in FIG. 9.

Meanwhile, in a case where the received re-designation instruction is not a tag print instruction, step S170 is performed.

In step S170, the CPU 21 determines whether or not a forced print instruction to forcibly print the print information 3 on the printing surface designated by the user on the designation screen 5 has been received as the re-designation instruction. In a case where the forced print instruction has been received, step S190 is performed, in which the CPU 21 controls the printer 2 to print the print information 3 on a final region of the printing surface of the continuous paper 8 designated by the user on the designation screen 5, as described above. This ends the processing for printing the print information 3 illustrated in FIG. 9. In this case, the print information 3 is not printed on the viewable surface of the continuous paper 8, and therefore the CPU 21 may control the tag printer 4 to print the print information 3 on a tag.

Meanwhile, in a case where the forced print instruction has not been received, step S180 is performed.

In this case, a switching print instruction to switch the printing surface on which the print information 3 is to be printed to the viewable surface of the continuous paper 8 has been received. Accordingly, in step S180, the CPU 21 performs a process similar to the process in step S30 of FIG. 7. Specifically, the CPU 21 prints the print information 3 on a final region of the viewable surface of the continuous paper 8 specified in step S110. This ends the processing for printing the print information 3 illustrated in FIG. 9.

As described above, in a case where a user designates a side opposite to the viewable surface of the continuous paper 8 as the printing surface on which the print information 3 is to be printed, the control device 10 issues a warning for the user by displaying the confirmation screen 7 illustrated in FIG. 10. By thus allowing the user to designate again the printing surface on which the print information 3 is to be printed on the confirmation screen 7, the control device 10 prints the print information 3 on the designated printing surface.

Note that the continuous paper 8 attached to the paper feeding roller 16 of the printer 2 need not necessarily be plain, and various kinds of continuous paper 8 are attachable to the paper feeding roller 16. For example, in some cases, continuous paper 8 (hereinafter referred to as "preprinted continuous paper 8A") on which information other than a job to be printed has been printed in advance before printing is performed by the printer 2 is attached to the paper feeding roller 16.

Figure 11:
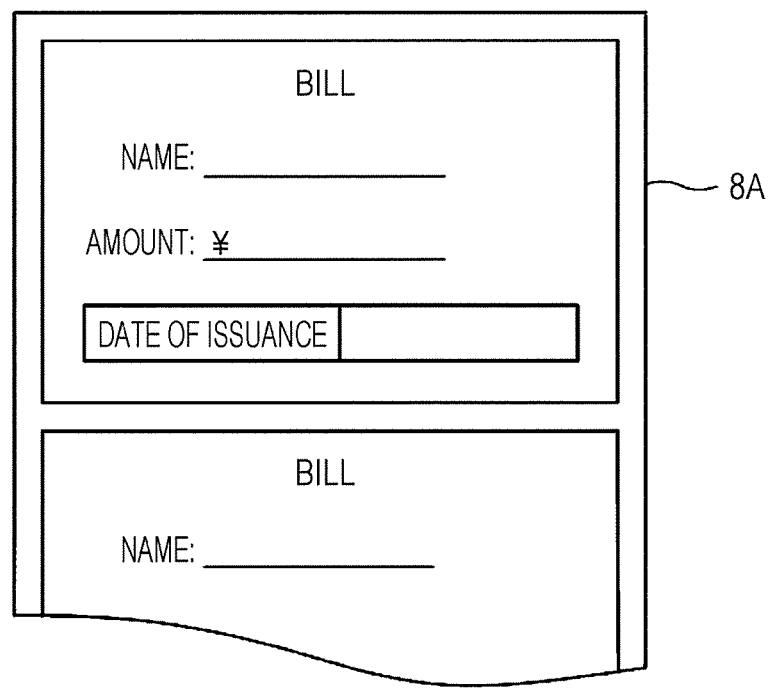
FIG. 11 illustrates an example of preprinted continuous paper.

FIG. 11 illustrates an example of the preprinted continuous paper 8A. As illustrated in FIG. 11, for example, a frame, characters, a figure, and the like common to all pages are printed in advance on the preprinted continuous paper 8A. Since the frame, characters, figure, and the like are printed in advance, these pieces of information need not be printed by the printer 2. This keeps a time for printing shorter and cost for printing lower than a case where plain continuous paper 8 is used. For this reason, the preprinted continuous paper 8A is widely used as a recording medium for the printer 2.

The preprinted continuous paper 8A of FIG. 11 is a recording medium on which a format of a bill is printed in advance. Individual bills are created by cutting blank portions between the bills by using a processing device after printing necessary information such as a name and an amount of money on each bill.

The preprinted continuous paper 8A may have a format printed on one surface thereof or may have a format printed on both surfaces thereof.

Since information other than a job to be printed has been also printed in advance on a final region of the preprinted continuous paper 8A, the printer 2 needs to print the print information 3 by performing processing different from the processing for printing the print information 3 illustrated in FIGS. 7 and 9.

Figure 12:
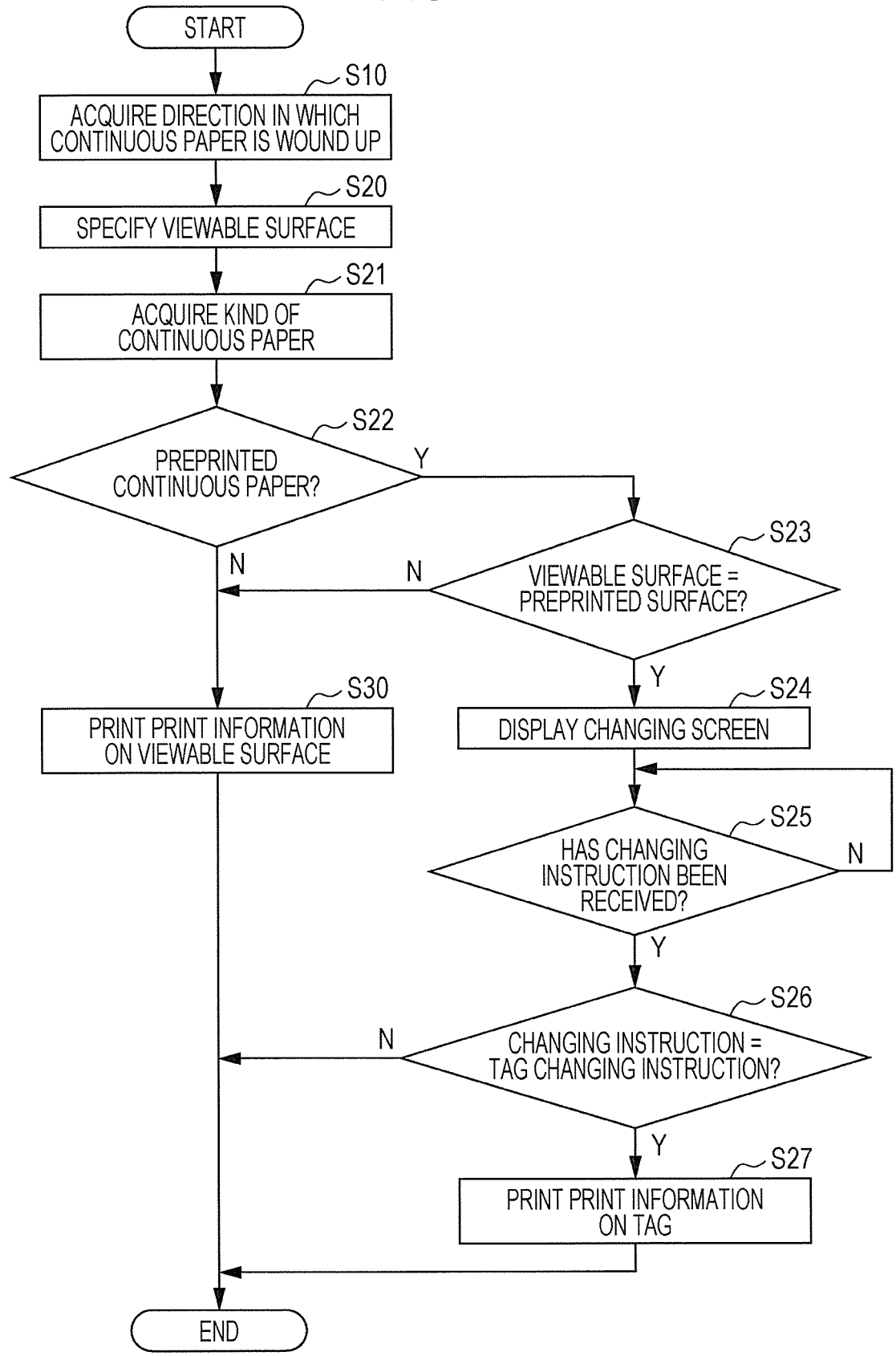
FIG. 12 is a flowchart illustrating an example of print processing for automatically switching the printing surface on which print information is to be printed in consideration of the kind of continuous paper.

FIG. 12 is a flowchart illustrating an example of processing for printing the print information 3 in consideration of the kind of continuous paper 8 executed by the CPU 21 in a case where "AUTOMATICALLY SWITCH PRINTING SURFACE DEPENDING ON DIRECTION IN WHICH CONTINUOUS PAPER IS WOUND UP" is designated by a user on the designation screen 5 illustrated in FIG. 8.

The flowchart illustrated in FIG. 12 includes steps S21 to S27 in addition to the steps of the flowchart of the processing for printing the print information 3 illustrated in FIG. 7.

In step S21, the CPU 21 acquires the kind of continuous paper 8 attached to the paper feeding roller 16 of the printer 2. The kind of continuous paper 8 is registered in advance in the printer 2 by a user by using the UI unit 12, and the registered kind of continuous paper 8 is stored in the non-volatile memory 24. Accordingly, the CPU 21 acquires the kind of continuous paper 8 from the non-volatile memory 24.

In step S22, the CPU 21 determines whether or not the kind of continuous paper 8 acquired in step S21 is the preprinted continuous paper 8A. In a case where the kind of continuous paper 8 is the preprinted continuous paper 8A, step S23 is performed. In a case where the kind of continuous paper 8 is the preprinted continuous paper 8A, information indicating whether a surface (hereinafter referred to as a "preprinted surface") on which information other than a job to be printed has been printed in advance is a front surface, a rear surface, or both of the front surface and the rear surface is added to the information on the kind of continuous paper 8 as information on the continuous paper 8.

In step S23, the CPU 21 determines whether or not the viewable surface of the preprinted continuous paper 8A specified in step S20 is the preprinted surface.

In a case where the viewable surface of the preprinted continuous paper 8A is not the preprinted surface, the print information 3 can be printed on the viewable surface of the preprinted continuous paper 8A since the viewable surface of the preprinted continuous paper 8A is plain. Therefore, step S30 described above is performed, in which the CPU 21 controls the printer 2 to print a body text of a printed material corresponding to a job to be printed and then print the print information 3 on a final region of the viewable surface of the preprinted continuous paper 8A specified in step S20. This ends the processing for printing the print information 3 illustrated in FIG. 12.

Meanwhile, in a case where it is determined in step S23 that the viewable surface of the preprinted continuous paper 8A is the preprinted surface, step S24 is performed.

Since information other than the job to be printed has been printed in advance on the viewable surface of the preprinted continuous paper 8A, there is no space where the print information 3 is to be printed. In this case, if the print information 3 is forcibly printed, the preprinted information and the print information 3 overlap each other. This makes it hard for the user to check the print information 3.

In view of this, in step S24, the CPU 21 causes a changing screen 9 for changing a method for printing the print information 3 to be displayed on the UI unit 12.

Figure 13:
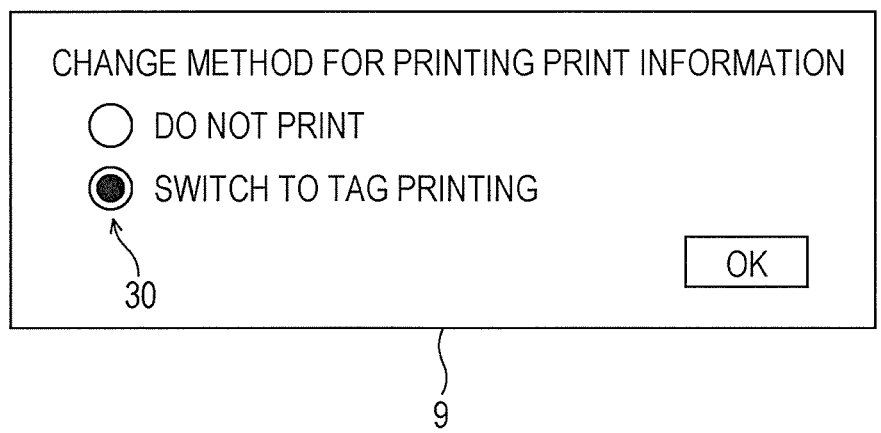
FIG. 13 illustrates an example of a changing screen.

FIG. 13 illustrates an example of the changing screen 9. On the changing screen 9, for example, "DO NOT PRINT" for cancelling printing of the print information 3 and "SWITCH TO TAG PRINTING" for switching a target on which the print information 3 is to be printed to a tag are displayed, and a radio button 30 is associated with each of these options. The user selects a radio button corresponding to a desired option and changes a method for printing the print information 3 by pressing an "OK" button.

The CPU 21 is notified about the changed method for printing the print information 3 as a changing instruction. In step S25, the CPU 21 determines whether or not the changing instruction has been received. In a case where the changing instruction has not been received, the CPU 21 waits until the changing instruction is received by repeatedly executing the determining process in step S25. Meanwhile, step S26 is performed in a case where the changing instruction has been received.

In step S26, the CPU 21 determines whether or not the received changing instruction is a changing instruction (hereinafter referred to as a "tag changing instruction") to switch a target on which the print information 3 is to be printed to a tag. Step S27 is performed in a case where the changing instruction is the tag changing instruction.

Since the user has changed the printing method to printing on a tag, the CPU 21 controls the tag printer 4 to print the print information 3 not on the continuous paper 8 but on a tag of the tag printer 4 in step S27. This ends the processing for printing the print information 3 illustrated in FIG. 12.

Meanwhile, in a case where it is determined in step S26 that the received changing instruction is not the tag changing instruction, the user has selected "DO NOT PRINT" on the changing screen 9, and therefore the CPU 21 ends the processing for printing the print information 3 illustrated in FIG. 12 without printing the print information 3 on the preprinted continuous paper 8A nor the tag.

Figure 14:
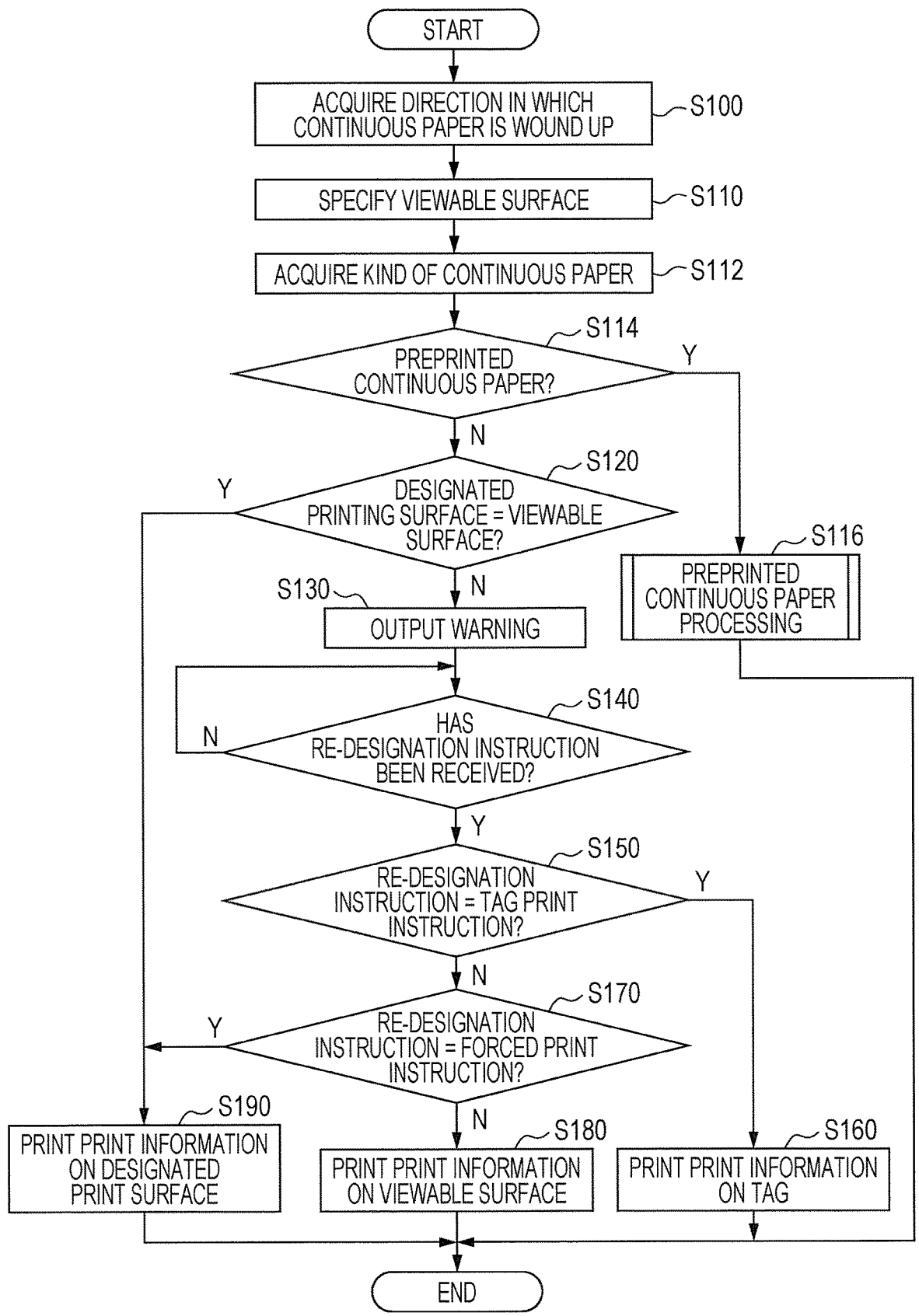
FIG. 14 is a flowchart illustrating an example of print processing for deciding a printing surface on which print information is to be printed in consideration of the kind of continuous paper in a case where one surface is designated as the printing surface on which the print information is to be printed.

FIG. 14 is a flowchart illustrating an example of processing for printing the print information 3 in consideration of the kind of continuous paper 8 executed by the CPU 21 in a case where "FRONT SURFACE" or "REAR SURFACE" is designated by the user as a printing surface on which the print information 3 is to be printed on the designation screen 5 illustrated in FIG. 8.

The flowchart illustrated in FIG. 14 includes steps S112, S114, and S116 in addition to the steps of the flowchart of the processing for printing the print information 3 illustrated in FIG. 9.

After the viewable surface of the continuous paper 8 is specified in step S110, the CPU 21 performs, in step S112, a process similar to the process in step S21 of FIG. 12. Specifically, the CPU 21 acquires the kind of continuous paper 8 attached to the paper feeding roller 16 of the printer 2.

In step S114, the CPU 21 performs a process similar to the process in step S22 of FIG. 12. Specifically, the CPU 21 determines whether or not the kind of continuous paper 8 acquired in step S112 is the preprinted continuous paper 8A. In a case where the kind of continuous paper 8 is not the preprinted continuous paper 8A, the CPU 21 executes the aforementioned processes in step S120 and subsequent steps.

Meanwhile, in a case where the kind of continuous paper 8 is the preprinted continuous paper 8A, step S116 is performed, in which the CPU 21 executes preprinted continuous paper processing.

Figure 15:
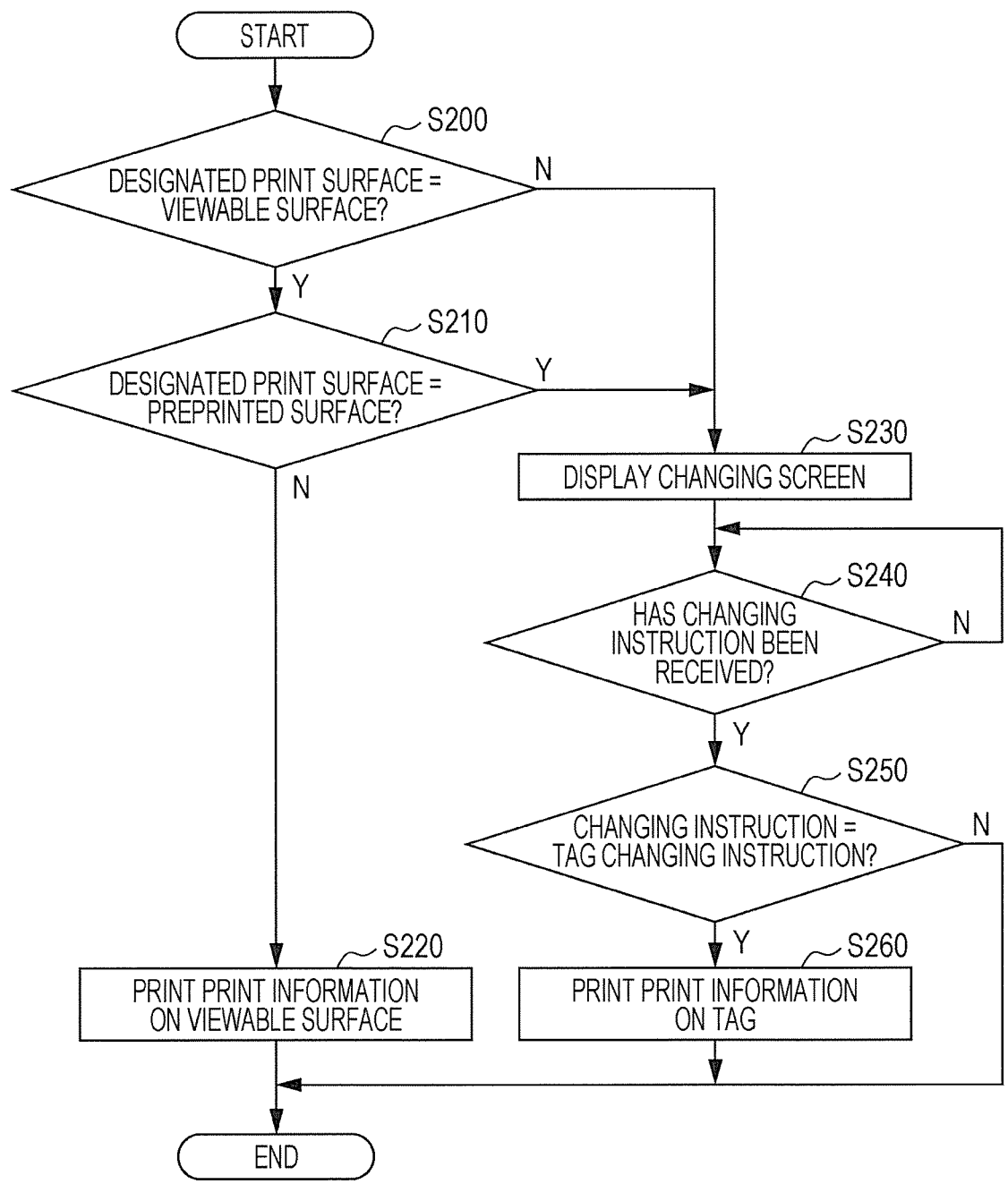
FIG. 15 is a flowchart illustrating an example of flow of preprinted continuous paper processing.

FIG. 15 is a flowchart illustrating an example of flow of the preprinted continuous paper processing executed in step S116 of FIG. 14.

In step S200, the CPU 21 determines whether or not a designated printing surface designated by the user on the designation screen 5 of FIG. 8 is the viewable surface of the preprinted continuous paper 8A. In a case where the designated printing surface is the viewable surface of the preprinted continuous paper 8A, step S210 is performed.

In step S210, the CPU 21 determines whether or not the designated printing surface designated by the user on the designation screen 5 of FIG. 8 is the preprinted surface of the preprinted continuous paper 8A. In a case where the designated printing surface is not the preprinted surface, the print information 3 can be printed on the viewable surface of the preprinted continuous paper 8A since the viewable surface of the preprinted continuous paper 8A is plain. Accordingly, step S220 is performed, in which the CPU 21 controls the printer 2 to print a body text of a printed material corresponding to a job to be printed and then print the print information 3 on a final region of the viewable surface of the preprinted continuous paper 8A specified in step S110 of FIG. 14. This ends the processing for printing the print information 3 illustrated in FIG. 15.

Meanwhile, in a case where it is determined in step S200 that the designated printing surface is not the viewable surface of the preprinted continuous paper 8A or in a case where it is determined in step S210 that the designated printing surface is the preprinted surface of the preprinted continuous paper 8A, step S230 is performed.

In this case, the print information 3 is printed on a side opposite to the viewable surface of the preprinted continuous paper 8A. Alternatively, even in a case where the printing surface on which the print information 3 is to be printed is the viewable surface of the preprinted continuous paper 8A, information (information other than the job to be printed) that has been printed in advance on the preprinted continuous paper 8A and the print information 3 overlap each other.

In view of this, in step S230, the CPU 21 causes the changing screen 9 illustrated in FIG. 13 to be displayed on the UI unit 12, thereby prompting the user to change a method for printing the print information 3.

In subsequent steps S240, S250, and S260, the CPU 21 performs processes similar to the processes in steps S25, S26, and S27 of FIG. 12 and then ends the preprinted continuous paper processing illustrated in FIG. 15. When the preprinted continuous paper processing ends, the processing for printing the print information 3 illustrated in FIG. 14 also ends.

As described above, the control device 10 changes a target on which the print information 3 is to be printed in accordance with the kind of continuous paper 8.

In the preprinted continuous paper processing illustrated in FIG. 15, in a case where it is determined in step S200 that the designated printing surface designated as the printing surface on which the print information 3 is to be printed is not the viewable surface of the preprinted continuous paper 8A, the control device 10 causes the changing screen 9 illustrated in FIG. 13 to be displayed on the UI unit 12, thereby prompting the user to select whether to print the print information 3 on a tag or cancel printing of the print information 3.

However, the control device 10 may switch the printing surface on which the print information 3 is to be printed to a side opposite to the designated printing surface, that is, to the viewable surface of the preprinted continuous paper 8A unless the viewable surface of the preprinted continuous paper 8A is the preprinted surface.

In the processing for printing the print information 3 illustrated in FIGS. 12 and 14, the changing screen 9 is displayed to prompt the user to change a method for printing the print information 3 in a case where the kind of continuous paper 8 is the preprinted continuous paper 8A. However, for example, a method for printing the print information 3 may be changed on the basis of other kinds of information concerning the continuous paper 8 such as price per 1 m of the continuous paper 8.

In a case where the price per 1 m of the continuous paper 8 is equal to or higher than predetermined price, which can be regarded as standard price of expensive paper, printing, on the continuous paper 8, information other than a body text of a printed material narrows a range available for printing of the body text accordingly, thereby leading to a rise in printing cost. Therefore, in such a case, the control device 10 may display the changing screen 9 to prompt the user to change a method for printing the print information 3.

Although the present disclosure has been described above by using the exemplary embodiment, the present disclosure is not limited to the scope described in the exemplary embodiment. The exemplary embodiment may be changed or modified in various ways without departing from the spirit of the present disclosure, and the change or modification is also encompassed within the technical scope of the present disclosure. For example, the order of processes may be changed without departing from the spirit of the present disclosure.

Although an example in which processing for printing the print information 3 is realized by software has been described in the exemplary embodiment, processing equivalent to the flowcharts illustrated in FIGS. 7, 9, 12, 14, and 15 may be performed, for example, by hardware such as an Application Specific Integrated Circuit (ASIC), a Field Programmable Gate Array (FPGA), or a Programmable Logic Device (PLD). This speeds up the processing as compared with a case where the processing for printing the print information 3 is realized by software.

As described above, the CPU 21 of the control device 10 may be replaced with a dedicated processor specialized for specific processing such as an ASIC, an FPGA, a PLD, a Graphics Processing Unit (GPU), or a Floating Point Unit (FPU).

Operation of the control device 10 according to the exemplary embodiment may be realized by a single CPU 21 or may be realized by plural CPUs 21. Furthermore, operation of the control device 10 according to the exemplary embodiment may be realized by cooperation of processors that are located physically apart from each other.

Although a case where the control program is installed in the ROM 22 has been described in the exemplary embodiment, this configuration is not restrictive. The control program according to the exemplary embodiment can be offered by being recorded in a recording medium that can be read by the computer 20. For example, the control program may be offered by being recorded in an optical disc such as a compact disc (CD)-ROM or a digital versatile disc (DVD)-ROM. Alternatively, the control program according to the exemplary embodiment may be offered by being recorded in a portable semiconductor memory such as a universal serial bus (USB) memory or a memory card.

Furthermore, the control device 10 may acquire the control program through the communication unit 11 from the external device connected to the communication line 6.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control device comprising
a processor configured to
acquire information on a direction in which continuous paper is wound up,
specify a viewable surface, which is a surface of the continuous paper viewable from a user in a state where the continuous paper has been wound up, on a basis of the direction in which the continuous paper is wound up, and
control a printer to print print information, which is information on a job printed on the continuous paper, on the viewable surface, wherein
the processor is configured to control the printer to print the print information on both surfaces of the continuous paper in a case where the processor fails to acquire the information on the direction in which the continuous paper is wound up.

2. The control device according to claim 1, wherein
the processor is configured to acquire the information on the direction in which the continuous paper is wound up after a print instruction to print the job is received from the user and before print control based on the print instruction is performed.

3. The control device according to claim 1, wherein
the processor is configured to
receive a designation instruction to designate a printing surface on which the print information is to be printed, and
perform control for outputting a warning in a case where the printing surface designated by the designation instruction is different from the viewable surface of the continuous paper.

4. The control device according to claim 2, wherein
the processor is configured to
receive a designation instruction to designate a printing surface on which the print information is to be printed, and
perform in control for outputting a warning in a case where the printing surface designated by the designation instruction is different from the viewable surface of the continuous paper.

5. The control device according to claim 3, wherein
the processor is configured to:
receive a re-designation instruction to designate again the printing surface on which the print information is to be printed after outputting the warning, and
control the printer to print the print information on the printing surface designated by the re-designation instruction.

6. The control device according to claim 4, wherein
the processor is configured to
receive a re-designation instruction to designate again the printing surface on which the print information is to be printed after outputting the warning, and
control the printer to print the print information on the printing surface designated by the re-designation instruction.

7. The control device according to claim 1, wherein
the processor is configured to control the printer to print the print information on a recording medium different from the continuous paper in a case where a target on which the print information is to be printed is not the continuous paper.

8. The control device according to claim 2, wherein
the processor is configured to control the printer to print the print information on a recording medium different from the continuous paper in a case where a target on which the print information is to be printed is not the continuous paper.

9. The control device according to claim 3, wherein
the processor is configured to control the printer to print the print information on a recording medium different from the continuous paper in a case where a target on which the print information is to be printed is not the continuous paper.

10. The control device according to claim 4, wherein
the processor is configured to control the printer to print the print information on a recording medium different from the continuous paper in a case where a target on which the print information is to be printed is not the continuous paper.

11. The control device according to claim 5, wherein
the processor is configured to control the printer to print the print information on a recording medium different from the continuous paper in a case where a target on which the print information is to be printed is not the continuous paper.

12. The control device according to claim 1, wherein
the processor is configured to further acquire information on the continuous paper and perform control for changing a target on which the print information is to be printed in accordance with a kind of continuous paper.

13. The control device according to claim 12, wherein the processor is configured to control the printer to print the print information on a recording medium different from the continuous paper in a case where information other than the job has been printed in advance on the continuous paper.

14. A non-transitory computer readable medium storing a program causing a computer to execute a process comprising:

acquiring information on a direction in which continuous paper is wound up;

specifying a viewable surface, which is a surface of the continuous paper viewable from a user in a state where the continuous paper has been wound up, on a basis of the direction in which the continuous paper is wound up; and controlling a printer to print print information, which is information on a job printed on the continuous paper, on the viewable surface, wherein the process further comprising controlling the printer to print the print information on both surfaces of the continuous paper in a case where the process fails to acquire the information on the direction in which the continuous paper is wound up.

15. A printer comprising
the control device according to claim 1,
wherein print information, which is information on a job printed on continuous paper, is printed on a printing surface of the continuous paper designated by the control device.

* * * * *